(12) United States Patent
Bühring

(10) Patent No.: US 8,881,991 B2
(45) Date of Patent: Nov. 11, 2014

(54) WIRING ARRANGEMENT FOR PROTECTING A BLEED AIR SUPPLY SYSTEM OF AN AIRCRAFT AGAINST OVERHEATING AND BLEED AIR SUPPLY INCORPORATING SUCH A WIRING ARRANGEMENT

(75) Inventor: Heiko Bühring, Oldenburg (DE)

(73) Assignee: Airbus Deutschland GmbH, Hamburg (DE)

(*) Notice: Subject to any disclaimer, the term of this patent is extended or adjusted under 35 U.S.C. 154(b) by 1699 days.

(21) Appl. No.: 12/301,278

(22) PCT Filed: May 14, 2007

(86) PCT No.: PCT/EP2007/004273
§ 371 (c)(1),
(2), (4) Date: Mar. 2, 2010

(87) PCT Pub. No.: WO2007/134749
PCT Pub. Date: Nov. 29, 2007

(65) Prior Publication Data
US 2010/0147399 A1 Jun. 17, 2010

(30) Foreign Application Priority Data
May 18, 2006 (DE) .................. 10 2006 023 498

(51) Int. Cl.
*G05D 23/00* (2006.01)
*B64D 13/06* (2006.01)
*G05D 23/24* (2006.01)
*G05D 23/20* (2006.01)

(52) U.S. Cl.
CPC ............... *B64D 13/06* (2013.01); *G05D 23/24* (2013.01); *Y02T 50/56* (2013.01); *B64D 2013/0618* (2013.01); *G05D 23/20* (2013.01)
USPC ............................ 236/80 A; 137/468; 62/161

(58) Field of Classification Search
CPC ........ B64D 13/00; B64D 13/06; B64D 13/08; B64D 37/32; B64D 2013/0618; Y02T 50/56; G05D 23/20; G05D 23/24
USPC ..... 62/161, DIG. 5; 236/72, 78 B, 80 A, 80 C, 236/DIG. 2
See application file for complete search history.

(56) References Cited

U.S. PATENT DOCUMENTS 2,931,574 A * 4/1960 Zuiderhoek .................. 236/1 C
2,937,011 A * 5/1960 Brahm ......................... 165/203
(Continued)

FOREIGN PATENT DOCUMENTS

DE 102004039667 2/2006
EP 0175698 5/1989
(Continued)

OTHER PUBLICATIONS

International Search Report, PCT/ISA/220, PCT/ISA/210, PCT/ISA/237.
(Continued)

*Primary Examiner* — Marc Norman
*Assistant Examiner* — Paolo Gonzalez
(74) *Attorney, Agent, or Firm* — Wood, Herron & Evans, LLP

(57) ABSTRACT

A wiring arrangement for protecting a bleed air supply system of an aircraft against overheating is associated with a bleed air supply system. The bleed air supply system includes a bleed air source, a bleed air feed, a shutoff valve arranged in the bleed air feed and a leakage monitoring device with a monitoring control device, which is connected via a shutoff circuit to the shutoff valve in such a way that the shutoff valve is closed when the shutoff circuit is interrupted. The wiring arrangement includes a thermal switch, which is connected in series with the shutoff valve and the monitoring control device to the shutoff circuit and which, once a predetermined limit temperature has been exceeded, interrupts the shutoff circuit.

13 Claims, 2 Drawing Sheets

(56) References Cited

U.S. PATENT DOCUMENTS

| | | | |
|---|---|---|---|
| 3,861,624 A * | 1/1975 | Lear | 244/118.5 |
| 4,482,114 A * | 11/1984 | Gupta et al. | 244/134 B |
| 4,655,607 A * | 4/1987 | Kern et al. | 374/4 |
| 4,691,760 A | 9/1987 | Gupta et al. | |
| 6,012,515 A * | 1/2000 | Stubbendorff et al. | 165/257 |
| 6,058,725 A * | 5/2000 | Monfraix et al. | 62/172 |
| 6,480,091 B1 * | 11/2002 | Scott et al. | 337/332 |
| 6,881,948 B2 * | 4/2005 | Dammann | 250/227.14 |
| 7,557,721 B2 * | 7/2009 | Chaniot | 340/584 |
| 7,618,008 B2 | 11/2009 | Scherer et al. | |
| 2004/0000353 A1 | 1/2004 | Jones | |
| 2006/0208846 A1 * | 9/2006 | Davis et al. | 337/333 |
| 2007/0267060 A1 * | 11/2007 | Scherer et al. | 137/13 |
| 2009/0235670 A1 * | 9/2009 | Rostek et al. | 60/785 |

FOREIGN PATENT DOCUMENTS

| | | |
|---|---|---|
| EP | 0934876 | 8/1999 |
| JP | 1237294 | 9/1989 |
| JP | 4086412 | 3/1992 |
| JP | 7301904 | 11/1995 |
| JP | 2001027863 | 1/2001 |
| RU | 2084378 | 7/1997 |
| SU | 307011 | 7/1971 |
| WO | WO 2006018225 A1 * | 2/2006 |
| WO | WO 2006018226 A1 * | 2/2006 |
| WO | WO 2007045646 A2 * | 4/2007 |

OTHER PUBLICATIONS

The Federal Service for Intellectual Property, Patents and Trademarks (Rospatent), English language Translation of "Decision on Granting a Patent for Invention," Application No. 2008144780/11(058412), Mar. 9, 2011.

Japanese Patent Office, Office Action Summary in related Japanese patent application, May 29, 2012, English Language (2 pgs.), Japanese Language (2 pgs.).

* cited by examiner

WIRING ARRANGEMENT FOR PROTECTING A BLEED AIR SUPPLY SYSTEM OF AN AIRCRAFT AGAINST OVERHEATING AND BLEED AIR SUPPLY INCORPORATING SUCH A WIRING ARRANGEMENT

TECHNICAL FIELD

The present invention relates to a wiring arrangement for protecting a bleed air supply system of an aircraft against overheating, the bleed air supply system comprising a bleed air source, a bleed air feed, a shutoff valve arranged between the bleed air feed and the bleed air source and a leakage monitoring device with a control device, which is connected via a shutoff circuit to the shutoff valve in such a way that the shutoff valve is closed when the shutoff circuit is interrupted. The invention also relates to a bleed air supply system with such a wiring arrangement.

BACKGROUND

In modern aircraft there are usually a fairly large number of devices that have to be provided with warm and pressurized air. One of the most important consumers of this kind is the air conditioning system of a commercial aircraft, which due to the great flight altitude of modern commercial aircraft and the low outside pressure prevailing there and the low outside temperatures has to create artificially an interior atmosphere that is tolerable for passengers. In order to be able to supply air at a high temperature for such air-consuming devices, a portion of the pneumatic air, also referred to as bleed air, is generally bled off from the aircraft engines at certain positions.

This air is often air which derives from one of the compression stages of the engine and is therefore under great pressure (up to approximately 50 PSI, corresponding to approximately 3.5 bar) and can have a high temperature of up to approx. 400° C. This bleed air must then be transported from the engines to the devices of the aircraft, which generally takes place via a pipework system.

It is normally advisable to cool the air from the engine to approx. 200-260° C. by means of a temperature control system (EBAS="Engine Bleed Air System") before it is supplied to the consuming devices. This can be achieved e.g. by interaction with very cold air from the aircraft environment in a heat exchanger. The EBAS generally has an electronic temperature control system, which registers the temperature of the cooled air and controls it as required. This air can then be routed to the consumers via pipes consisting mostly of titanium alloys.

If the pipework system has damaged points, the very hot bleed air, which is under high pressure, can escape at these and act on the surroundings of the pipework system. The heating associated with this can cause damage to aircraft components that come into contact with the hot air.

In particular, power lines, fuel lines, hydraulic lines or other sensitive parts close to the pipework system can be affected by damage in this case. Even bearing members of an airframe, for example, can be damaged. Such damage can possibly seriously impair the flight safety of an aircraft and entail grave consequences for the safety of the passengers and crew up to the possible crash of the aircraft.

For this reason sensors for detecting fractures are now fitted in aircraft along the entire pipework system, these being evaluated by a leakage monitoring system that is also known as OHDS ("OverHeat Detection System"). The sensors are normally surface sensors, which consist of cylindrical wires a few millimeters thick that contain between the core and sheath a filling that has a temperature-dependent electrical resistance. Below a certain response temperature, which can be set within certain limits during production, the resistance is very great. However, if this response temperature is exceeded, the resistance is abruptly reduced by several orders of magnitude. Such a change in resistance can easily be detected electronically by a monitoring device.

If hot air emerges from the pipework system through a leak in such a system, it heats the surrounding sensors until these reach the response temperature and the monitoring system detects the leak with reference to the change in resistance. Additional electronics in the monitoring system (OHDS) then interrupt the air supply in the section concerned by closing an assigned shutoff valve, which is closed in the de-energized state, by turning off the valve power supply.

The temperature control system EBAS and the leakage monitoring system OHDS are generally realized with the same hardware in a common computer BMC ("Bleed Monitoring Computer").

EP 0 175 698 B1 discloses a bleed air supply system with a leakage monitoring device with a control device, which is connected to valves for turning off the bleed air flow.

In DE 10 2004 039 667 A1, an air supply device is described in which an air supply can be sealed off via a valve that can be controlled on the basis of signals from temperature sensors.

In the system according to the prior art described above, if the temperature control system fails, the temperature of the air in the pipework system can rise to the temperature of the uncooled bleed air, thus up to approx. 400° C. The pipework system lying downstream of the EBAS is not designed for such hot air, and in particular seals joining individual pipes can be strongly affected and degenerate if they are exposed to such hot air. A leak with hot air flowing out can arise due to this.

Furthermore, if also a system fault in the monitoring computer BMC occurs, this would affect the leakage monitoring device, which is in itself independent of the temperature control system and in such a case (EBAS failure and fault in BMC) then would not automatically shut off the bleed air flow, with possible serious consequences for flight safety.

These possible serious consequences must be taken into consideration in development in that a high safety level (Development Assurance Level, DAL) is specified for the bleed air supply system. This leads to a very cost-intensive development process.

SUMMARY OF THE INVENTION

The object of the invention is to remedy the aforementioned problems of the prior art.

Starting out from a known wiring arrangement specified initially, this object is achieved according to the invention in that the wiring arrangement comprises a thermal switch, which is connected in series with the shutoff valve and the monitoring control device to the shutoff circuit and which interrupts the shutoff circuit once a predetermined limit temperature has been exceeded.

According to the invention an entity is thus introduced that can execute a shutoff of the supply of hot bleed air independently of the monitoring control device (such as e.g. an OHDS). If a fault should occur in the leakage monitoring device, the wiring arrangement according to the invention can nevertheless cause an interruption in the hot air supply. This is accompanied by increased safety for the aircraft, the passengers and the crew, and development costs that would arise with the alternative use of complex and expensive software can be saved.

Furthermore, a rise in temperature in the bleed air feed can be detected promptly, so that in the event of a malfunction components are not exposed to undesirably high temperatures and pressures, or are exposed only for a brief period. Even if the leakage monitoring device is functioning perfectly, it is possible to react by means of the wiring arrangement according to the invention to a temperature rise in the bleed air feed before a leak occurs. Components of the aircraft are thus preserved and signs of wear reduced.

The wiring arrangement according to the invention is technically simple to realize and also inexpensive for this reason. Furthermore, it can easily be retrofitted to systems already installed.

The thermal switch is preferably in thermally conductive contact with the bleed air feed. In particular, it is advantageous if the thermal switch is in thermally conductive contact with a surface of a pipe of the bleed air feed. Transmission and auxiliary systems for monitoring the air temperature, which systems are susceptible to faults and impair the accuracy and speed of measurement, can thus be eliminated.

According to one embodiment, it is envisioned that the thermal switch is a mechanical switch. Such a construction is particularly reliable and has little susceptibility to faults, and is also inexpensive to manufacture. Depending on the requirement and the environment in which it is used, the thermal switch can also be formed non-mechanically, e.g. as a thermo-electronic switch.

It can be advisable to set the limit temperature mentioned at 300° C. This value is above the typical temperature of the cooled air in the bleed air feed of roughly 200-260° C., so that the thermal switch can react to an undesirable temperature rise before the air in the bleed air feed becomes so hot due to a malfunction that it heats parts of the bleed air feed above their loading tolerance. However, it goes without saying that the limit temperature can and should be matched to the respective conditions of use.

In a further embodiment of the invention, the bleed air supply system can comprise a cool air supply system with a temperature control device. Thus the bleed air from the bleed air source can be brought to a temperature controlled by the temperature control device such as an EBAS before it is fed into the bleed air feed. Thus air can be conducted through the bleed air feed at a temperature such as is required by consuming systems and for conducting which the bleed air feed is rated.

It can also be provided that the bleed air source and the cool air supply system are connected thermally to one another via a heat exchanger, the heat exchanger being connected furthermore to the bleed air feed. The thermal switch is preferably arranged in the bleed air feed directly following the heat exchanger. In such an arrangement the thermal switch can detect a potential temperature rise before the excessively hot air travels a long way in the bleed air feed and possibly causes damage on this path before the excessively hot air is detected.

According to another preferred embodiment of the invention, the thermal switch is designed as a double switch with two switching levels. Automatically alternating switching off and switching back on again of the thermal switch in the event of temperature variations in the hot air can thereby be prevented.

It is provided in this case that the first switching level operates as described above. The second switching level can advantageously be designed, for example, such that it is connected to ground below a critical temperature. This second switching level is preferably formed such that it is not connected to ground above the critical temperature. Thereby can be generated for example a switching signal for further processing by optionally connected further systems.

The critical temperature can be determined such that it corresponds to the limit temperature, so that the switching signal is generated and the air supply is turned off at the same time.

Limit temperature and critical temperature can also have different values. Thus it can be provided, for example, that the critical temperature is below the limit temperature of the thermal switch, in order to generate a switching signal before the thermal switch interrupts the shutoff circuit.

The second switching level can be connected for example in the scope of further embodiments to a fault signal lamp (FAULT lamp) and be used as a switching signal to activate the lamp. Alternatively the second switching level can be connected to another system such as e.g. the flight warning system (FWS), which evaluates the switching signal produced. On the basis of this evaluation the FWS can for example initiate a procedure that interrupts the shutoff circuit permanently, in order to reliably cut off the supply of excessively hot air.

The present invention also relates to a bleed air supply system, which comprises a wiring arrangement as described above.

BRIEF DESCRIPTION OF THE DRAWINGS

The invention is now exemplified with reference to the following schematic drawings to and explained in greater detail.

DETAILED DESCRIPTION

Figure 1:
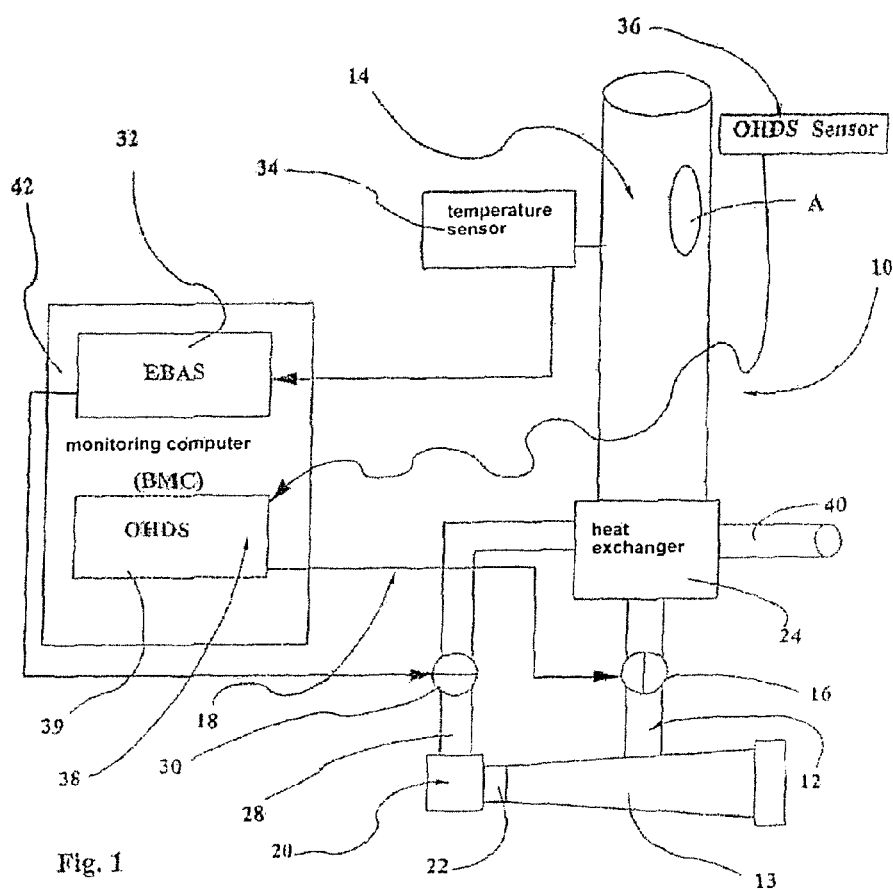
FIG. 1 shows a bleed air supply system according to the prior art.

FIG. 1 shows a bleed air supply system 10 according to the prior art. This comprises a bleed air source 12, which bleeds off hot air from an engine 13 and is connected to a bleed air feed 14. Arranged between the bleed air source 12 and the bleed air feed 14 is a shutoff valve 16, which is actuated via a shutoff circuit 18. If the shutoff circuit 18 is interrupted, the shutoff valve 16 closes and interrupts the supply of air from the bleed air source 12. The bleed air feed 14 supplies hot air to consumers in the aircraft (not shown).

A cool air supply system 20 leads cool air from the aircraft environment through a cooling inlet 22 to a heat exchanger 24. The cool air supply system 20 can be connected e.g. to an air inlet of an engine 13. The heat exchanger 24 is also connected to the bleed air source 12.

The cool air supply system 20 comprises cool air lines 28 and a control valve 30, which is adapted to be controlled by a temperature control device 32, also termed EBAS. The temperature control device 32 is connected to at least one temperature sensor 34 arranged in the bleed air feed 14 and evaluates signals emitted by this. Arranged around the bleed air feed 14 are excess temperature sensors 36, also called OHDS sensors, which are connected to a leakage monitoring device 38 of the OHDS type, which has a control device 39. The monitoring control device 39 is connected in turn via the shutoff circuit 18 to the shutoff valve 16.

It should be noted that the bleed air feed 14 can comprise a pipework system with a plurality of pipes, which system is not shown here in its entirety. The bleed air feed 14 is designed to conduct hot air flowing through it to consumer systems such as the air conditioning system of the aircraft, which systems are likewise not shown here.

In the heat exchanger 24 the hot engine air at approximately 400° C. coming from the bleed air source 12 is cooled with the aid of cool air supplied by the cool air supply system 20. According to the temperature sensor 34 the temperature control device 32 controls by way of the control valve 30 the amount of cool air supplied and thus the degree of cooling of the bleed air in the heat exchanger 24. The heated cool air can be led away from the heat exchanger 24 through a cool air removal line 40. The cooled hot air, on the other hand, which following cooling typically has a temperature of approximately 200-260° C., is supplied to the bleed air feed 14.

The temperature control device 32 and the control device 39 are realized jointly in a monitoring computer 42, which is also termed BMC. Systems that are independent of one another are assigned here to temperature control and leakage monitoring.

If the temperature control in such a system should fail and e.g. the operation of the cool air supply completely ceases, insufficiently cooled air flows from the bleed air source 12 into the bleed air feed 14. The bleed air feed 14 is not designed for air temperatures of 400° C., such as could occur in the event of total failure of the cool air supply. Due to this, leaks can occur in the bleed air feed 14.

Hot air then emerges from a leak A that has arisen and one or more excess temperature sensors 36 arranged near this leak A are heated by the hot air flowing out until they exceed a certain limit temperature $T_{OHDS}$. At this point a sensor signal is forwarded to the monitoring control device 39, which thereupon interrupts the shutoff circuit 18, so that the shutoff valve 16 closes and the hot air supply from the bleed air source 12 is interrupted.

If the monitoring device 38 or excess temperature sensors 36 connected to it should fail in addition to the temperature control system, for instance because a fault which affects both systems occurs in the BMC monitoring computer 42, a leak can remain undetected for a fairly long period and the hot air flowing out can damage surrounding aircraft components. In this way lines for power, hydraulics or fuel inter alia can be affected or damage can be caused to the structure of the aircraft. In extreme cases such damage can lead to a significant risk of crashing for an aircraft.

Figure 2:
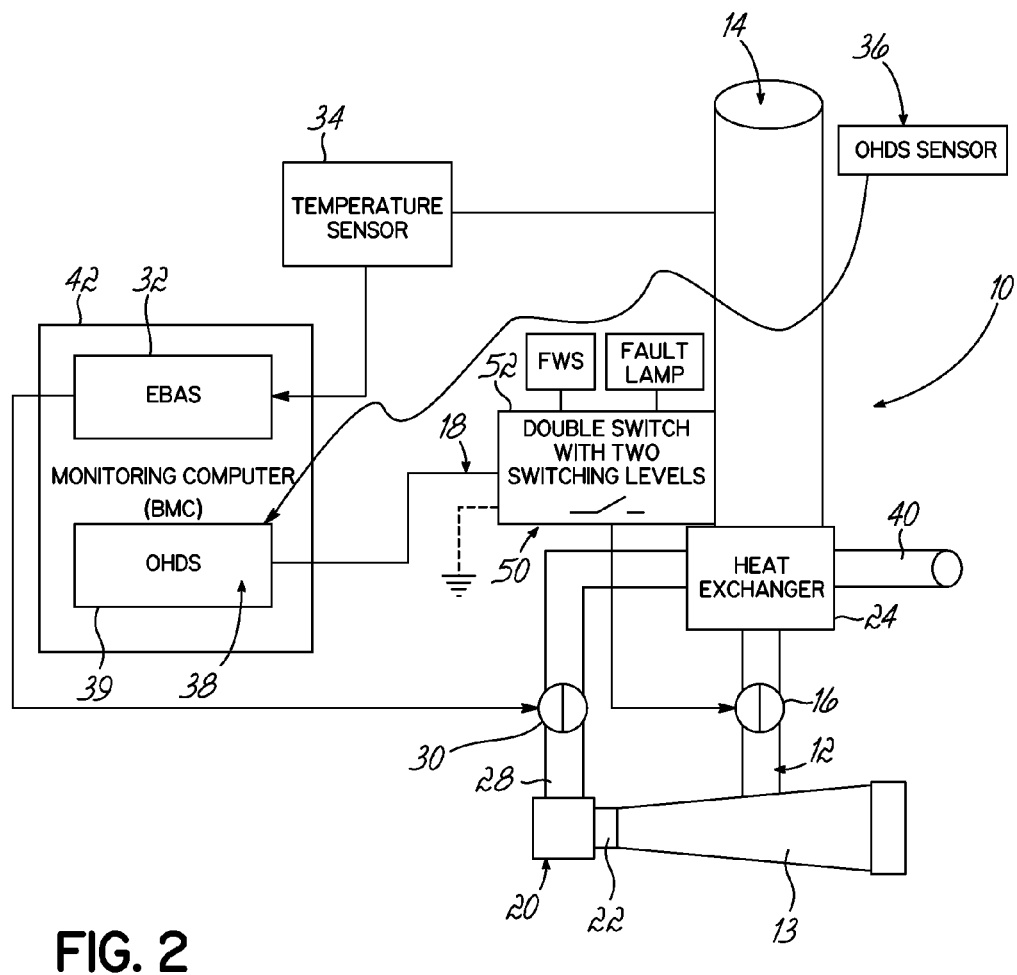
FIG. 2 shows a bleed air supply system with a wiring arrangement according to the invention.

FIG. 2 shows a bleed air system similar to FIG. 1, which in addition, however, has a wiring arrangement 50 according to the invention. Identical components are designated by the same reference signs in the embodiment of the invention shown in FIG. 2.

The wiring arrangement 50 comprises a thermal switch 52, which is connected between the shutoff valve 16 and the monitoring control device 39 in the shutoff circuit 18. The thermal switch 52 is in thermally conductive contact with a surface of the bleed air feed 14, so that it is in virtually direct contact with the hot air led through the bleed air feed 14. As is apparent from FIG. 2, the thermal switch 52 is arranged in the bleed air feed 14 directly downstream of the heat exchanger 24. The thermal switch 52 in this embodiment is configured so that when a limit temperature $T_G$ is exceeded it interrupts the shutoff circuit and the shutoff valve is thereby closed. The limit temperature $T_G$ is set in this case to 300° C.

If a fault now occurs in the temperature control system and the hot air coming from the bleed air source 12 is no longer sufficiently cooled in the heat exchanger 24, the temperature of the air in the bleed air feed 14 rises, as mentioned in the description for FIG. 1. As soon as the temperature of the hot air exceeds the limit temperature $T_G$ of the thermal switch 52, however, the thermal switch 52 interrupts the shutoff circuit 18 and the shutoff valve 16 closes. The supply of air from the bleed air source 12 is thereby interrupted before the hot air can produce a leak in the bleed air feed 14.

If a leak should nevertheless occur in the bleed air feed 14, for instance because a malfunction of the thermal switch 52 exists, the leakage monitoring system as described above will interrupt the air supply.

A simple option is created by the wiring arrangement described for arranging an independent entity for overheating protection in a bleed air supply system. A particular advantage of the present arrangement consists in the fact that it can be installed without any great outlay in existing bleed air supply systems of aircraft.

It is easily possible for a person skilled in the art to modify and vary the embodiment of the invention described above in the scope of the appended protective claims and in particular to adapt it suitably to specific designs of the bleed air supply system.

The invention claimed is:

1. A wiring arrangement for protecting a bleed air supply system of an aircraft against overheating, the bleed air supply system comprising a bleed air source connected to an aircraft engine, a bleed air feed, a shutoff valve arranged in the bleed air feed and a leakage monitoring device with a control device, which is connected via a shutoff circuit to the shutoff valve in such a way that the shutoff valve is closed when the shutoff circuit is interrupted, the wiring arrangement comprising:

a thermal switch in thermally conductive contact with the bleed air feed, which is connected in series with the shutoff valve and the control device in the shutoff circuit and which, once a predetermined limit temperature has been exceeded, interrupts the shutoff circuit, and wherein the thermal switch is connected directly between the shutoff valve and the control device in the shutoff circuit.

2. The wiring arrangement according to claim 1, wherein the bleed air feed also comprises at least one pipe and the thermal switch is in thermally conductive contact with a surface of the at least one pipe.

3. The wiring arrangement according to claim 1, wherein the thermal switch is a mechanical switch.

4. The wiring arrangement according to claim 1, wherein the predetermined limit temperature is approximately 300° C.

5. The wiring arrangement according to claim 1, wherein the bleed air supply system also comprises a cool air supply system, wherein the cool air supply system supplies cool air.

6. The wiring arrangement according to claim 5, wherein the bleed air source and the cool air supply system are connected thermally to one another via a heat exchanger, the bleed air feed also being connected to the heat exchanger, and the thermal switch being arranged directly downstream of the heat exchanger in the bleed air feed.

7. The wiring arrangement according to claim 1, wherein the thermal switch is designed as a double switch with two switching levels.

8. The wiring arrangement according to claim 7, wherein one of the two switching levels of the thermal switch formed as a double switch is connected to ground below a critical temperature.

9. The wiring arrangement according to claim 8, wherein the critical temperature is 300° C.

10. The wiring arrangement according to claim 7, wherein one of the two switching levels of the thermal switch formed as a double switch is not connected to ground above a critical temperature.

11. The wiring arrangement according to claim 7, wherein one of the two switching levels of the thermal switch formed as a double switch is connected to a fault signal lamp.

12. The wiring arrangement according to claim 7, wherein one of the two switching levels of the thermal switch formed as a double switch is connected to a flight warning system.

13. A bleed air supply system, comprising the wiring arrangement of claim 1.

* * * * *

UNITED STATES PATENT AND TRADEMARK OFFICE
CERTIFICATE OF CORRECTION

PATENT NO.        : 8,881,991 B2                                    Page 1 of 1
APPLICATION NO.   : 12/301278
DATED             : November 11, 2014
INVENTOR(S)       : Heiko Buhring It is certified that error appears in the above-identified patent and that said Letters Patent is hereby corrected as shown below:

On the Title Page, Item (54) and in the Specification, Column 1, Title, delete "WIRING ARRANGEMENT FOR PROTECTING A BLEED AIR SUPPLY SYSTEM OF AN AIRCRAFT AGAINST OVERHEATING AND BLEED AIR SUPPLY INCORPORATING SUCH A WIRING ARRANGEMENT" and add --WIRING ARRANGEMENT FOR PROTECTING A BLEED AIR SUPPLY SYSTEM OF AN AIRCRAFT AGAINST OVERHEATING AND BLEED AIR SUPPLY SYSTEM INCORPORATING SUCH A WIRING ARRANGEMENT--

Signed and Sealed this
Seventeenth Day of March, 2015

Michelle K. Lee
*Director of the United States Patent and Trademark Office*